(12) United States Patent
Schmitt

(10) Patent No.: US 9,046,614 B2
(45) Date of Patent: Jun. 2, 2015

(54) X-RAY DETECTOR WITH INTEGRATING READOUT CHIP FOR SINGLE PHOTON RESOLUTION

(75) Inventor: Bernd Schmitt, Lauchringen (DE)

(73) Assignee: Paul Scherrer Institut, Villigen (CH)

( * ) Notice: Subject to any disclaimer, the term of this patent is extended or adjusted under 35 U.S.C. 154(b) by 601 days.

(21) Appl. No.: 13/393,009

(22) PCT Filed: Jun. 24, 2010

(86) PCT No.: PCT/EP2010/059031
§ 371 (c)(1),
(2), (4) Date: Mar. 16, 2012

(87) PCT Pub. No.: WO2011/023431
PCT Pub. Date: Mar. 3, 2011

(65) Prior Publication Data
US 2012/0161016 A1    Jun. 28, 2012

(30) Foreign Application Priority Data
Aug. 28, 2009 (EP) ..................................... 09168955

(51) Int. Cl.
*G01T 1/17*    (2006.01)
(52) U.S. Cl.
CPC ....................... *G01T 1/17* (2013.01)
(58) Field of Classification Search
CPC ........... G01T 1/24; G01T 1/246; G01T 1/247; H01L 31/02
USPC .................................................. 250/370.09
See application file for complete search history.

(56) References Cited

U.S. PATENT DOCUMENTS

| | | | |
|---|---|---|---|
| 5,892,540 A * | 4/1999 | Kozlowski et al. | 348/300 |
| 6,128,039 A | 10/2000 | Chen et al. | |
| 6,163,029 A * | 12/2000 | Yamada et al. | 250/370.09 |
| 6,329,658 B1 | 12/2001 | Mestais et al. | |
| 6,538,591 B2 | 3/2003 | Kikuchi et al. | |

(Continued)

FOREIGN PATENT DOCUMENTS

| | | |
|---|---|---|
| EP | 0 813 338 A2 | 12/1997 |
| FR | 2 864 628 A1 | 7/2005 |

(Continued)

*Primary Examiner* — Casey Bryant
(74) *Attorney, Agent, or Firm* — Laurence A. Greenberg; Werner H. Stemer; Ralph E. Locher

(57) ABSTRACT

An X-ray detector contains a layer of photosensitive material and an N×M array of photo-detector diodes disposed in the photosensitive material. Each of the diodes has a bias potential interface and a diode output interface. The bias potential interface is connected to a bias potential. The X-ray detector further has an N×M array of high gain, low noise readout unit cells, one readout unit cell for each diode. Each cell contains an input interface connected to the diode output interface, a high-gain voltage amplifying device having an integration capacitor, a first switch in parallel to the integration capacitor and a sample/hold capacitor disposed between a second switch and third switch. The sample/hold capacitor is connectable to the voltage amplifying device via the second switch and is connectable to a signal output line. A multiplexer contains a row select and a column select circuit allowing access to each readout cell unit.

13 Claims, 2 Drawing Sheets

(56) References Cited

U.S. PATENT DOCUMENTS

| | | |
|---|---|---|
| 7,514,688 B2 | 4/2009 | Broennimann et al. |
| 7,573,016 B2 | 8/2009 | Koyama |
| 7,615,753 B2 | 11/2009 | Audebert et al. |
| 2005/0068438 A1 | 3/2005 | Kozlowski |
| 2006/0071170 A1* | 4/2006 | Broennimann et al. .. 250/370.09 |
| 2008/0099689 A1* | 5/2008 | Nygard et al. .......... 250/370.09 |
| 2009/0285352 A1* | 11/2009 | Schmitt ........................ 377/54 |
| 2011/0141255 A1 | 6/2011 | Mori et al. |
| 2014/0166861 A1* | 6/2014 | Schmitt et al. ............ 250/208.2 |

FOREIGN PATENT DOCUMENTS

| | | |
|---|---|---|
| JP | H1144764 A | 2/1999 |
| JP | H11313257 A | 11/1999 |
| JP | 2001513192 A | 8/2001 |
| JP | 2002199292 A | 7/2002 |
| JP | 2006303871 A | 11/2006 |
| JP | 2007508740 A | 4/2007 |
| JP | 2008154957 A | 7/2008 |
| WO | 2004/064168 A1 | 7/2004 |
| WO | 2009/131151 A1 | 10/2009 |

* cited by examiner

X-RAY DETECTOR WITH INTEGRATING READOUT CHIP FOR SINGLE PHOTON RESOLUTION

BACKGROUND OF THE INVENTION

Field of the Invention

The present invention relates to an X-ray detector with charge integrating readout chip for single photon resolution.

X-ray detectors with integrated readout unit chips are widely used in detector systems for X-ray applications at synchrotrons or with lab equipment (lab diffractometers) in the field of material science, crystallography, non destructive testing and medical applications. These applications typically cover a large energy range from 1 keV to 200 keV. Depending on the semiconductor photo detector layer the free load generated by the photon absorption can also range within appropriate and determinable limits.

Typically, the detectors are hybrid detectors consisting of an X-ray sensitive layer (silicon sensor) and readout chips. In case of 2-dimensional detectors (pixel detectors) each pixel in the sensor is directly connected by (bump bonding or flip chip bonding) to the corresponding pixel in the readout unit chip. The pixel size is therefore limited by the pixel size in the readout unit chip. Therefore, the number of electronic components per pixel in the readout chip is very limited.

According to the prior art, for example known from the European Patent Application EP 1 581 971 A1, the readout unit chip comprises n (either 1- or 2 dimensional) independently working channels. Each channel has a charge sensitive preamp, gain stages, a comparator and a counter. Each channel can count single photons independently of the other channels. An image requires two phases: 1) acquisition mode (where the counters count the incoming photons) and 2) readout mode (where the counting is disabled and the numbers for the counts per channel are read out).

The signal after the gain stages is a gaussian like pulse with the pulse height being proportional to the input charge. If the pulse height is above the comparator threshold the counter of the channel is incremented by one independent of the pulse height.

With these X-ray detectors, the largest current problems are:

i) For fast frame rates the readout time (dead time) is very significant and limits the frame rate. Many measurements are currently limited by the frame rate. The small pixel size prohibits, however, the implementation of more than one counter or an intermediate storage per channel.

ii) For high incoming photon rates (500 KHz-3 MHz) the analogue signal starts to pile up, causing the signal to not drop below the comparator threshold, therefore loosing counts. The measured rate therefore has to be corrected (rate correction). Above 3 MHz single photon counting systems as implemented today are basically not usable anymore since the signal stays always above the comparator threshold. The channel is saturated in this case.

iii) For photons falling in the boundary region between channels, the charge is shared between channels. This causes count rate fluctuations due to fluctuations in the gain and in the effective threshold of the channels. It also limits the pixel size since at smaller pixel sizes the charge is always shared and single photon counting is no longer possible.

iv) For pump and probe measurements a sample is excited (pumped) and then after a selectable time the counting is enabled for a short period (probe). This is then repeated as often as required for the collection of the statistics and only then read out. Where the conditions are not constant it is necessary to make (at least) 2 simultaneous measurements (usually pumped and un-pumped). This is currently not possible since the counts can only be accumulated in one internal counter.

BRIEF SUMMARY OF THE INVENTION

It is therefore an objective of the present invention to provide an X-ray detector being capable of counting incident photons arriving at high frequency without loosing counts due to analogue signal pile up or due to the dead time of the readout electronics due to time cycles required for counter readout.

This objective is achieved according to the present invention by an X-ray detector, comprising:
  a) a layer of photosensitive material;
  b) an N×M array of photo-detector diodes arranged in said layer of photosensitive material; each of said photo-detector diodes having a bias potential interface and a diode output interface, said bias potential interface of each photodetector diode being connected to a bias potential;
  c) an N×M array of high gain, low noise readout unit cells, one readout unit cell for each photo-detector diode;
  d) each readout unit cell comprising:
    d1) an input interface connected to said diode output interface, a high-gain charge to voltage amplifying means comprising an integration capacitor,
    d2) a first switch in parallel to the integration capacitor,
    d3) a sample/hold capacitor disposed between a second switch and a third switch, wherein the sample/hold capacitor is connectable to an output of the high-gain voltage amplifying means via the second switch and is connectable to a signal output line via the third switch;
  e) a multiplexing means comprising a row select and a column select circuit allowing to access each readout cell unit, i.e. to read out the analog signal as actually stored in the sample/hold capacitor to a data processing means controlling the multiplexing means.

The basic idea of the new X-ray detector is therefore to use a charge integrating system instead of a single photon counting system as known in the prior art. The achievable low noise of the charge integrating system allows using it with single photon counting resolution. In this charge integrating system the charge is integrated on the integration capacitor and no pulse is formed as in single photon counting systems according to the prior art. The voltage on the output (Preamp out) of the charge integration stage is proportional to the input charge. At the end of the acquisition the integration signal is switched to and stored on a hold capacitor thereby allowing to reset the preamp and to start a new acquisition period independent from the further read out of the charge signal stored in the hold capacitor.

In a preferred embodiment of the present invention, the high-gain voltage amplifying means may be chosen to have a noise signal being small as compared to the signal generated by a single photon incident. The right selection of the amplifying means therefore contributes to the accuracy of the single photon resolution approach.

In order to satisfy the specific counting demands of a vast range of possible applications with respect to the counting rate of incident photons within appropriate acquisition intervals the sample/hold capacitor ($C_S$) and the integration capacitor ($C_{fb}$) can be advantageously chosen to cover a dynamic range of 0 to 1000 incident photons per acquisition interval. Typically, the acquisition interval can range from 20 ns up to any desired value.

The dead time for a detector during its readout is a crucial parameter for any application. Therefore, the switches are operational to allow a continuous mode: while reading out the output signal stored in the sample/hold capacitors the integration of the input charge is done in parallel. This embodiment hardly consumes time for the switching and enables therefore a continuous acquisition of the incident photons.

In many applications the determination of the exact position of the absorption of the incident photon is an important issue. So far, the spacial resolution is limited by the size of the photo detector diodes which require together with its read out unit cells a finite space. A further preferred embodiment of the present invention therefore provides the data processing means being enabled to perform an interpolation of the position of a photon being absorbed in a boundary region between neighboring photo-detector diodes, said interpolation being triggered by a coincident split voltage signal for neighboring photo-detector diodes, wherein the split voltage signal in each of the neighboring photo-detector diodes is smaller than the voltage signal of an incident photon absorbed within one photo-detector diode.

A further preferred embodiment of the present invention provides a reliable photon energy resolution wherein the integrated voltage for a single incident photon is indicative for the energy of the photon, and wherein the dependency between the integrated voltage and the photon energy can be determined by a polynomial function, preferably a linear function.

In order to increase the freedom of action in the detector applications, the data processing means may comprise a window discrimination, thereby only incrementing a counter for those channels having an output signal within a predetermined window.

In some application it might be useful to assign the count values of various acquisition intervals to different counters. Therefore, the data processing means may comprise a counter multiplexer being capable to switch the output signal for each readout unit cell alternately to at least two counters. Consequently, channel-wise one of the at least two counters can be reserved to count the incident photons for a pumped sample state and the other of the at least two counters can be reserved to count the incident photons for an un-pumped sample state.

Further preferred embodiments of the present invention can be taken from the remaining depending claims.

Preferred embodiments of the present invention are hereinafter discussed in more detail with reference to the following drawings which depicts in:

DESCRIPTION OF THE INVENTION

Figure 1:
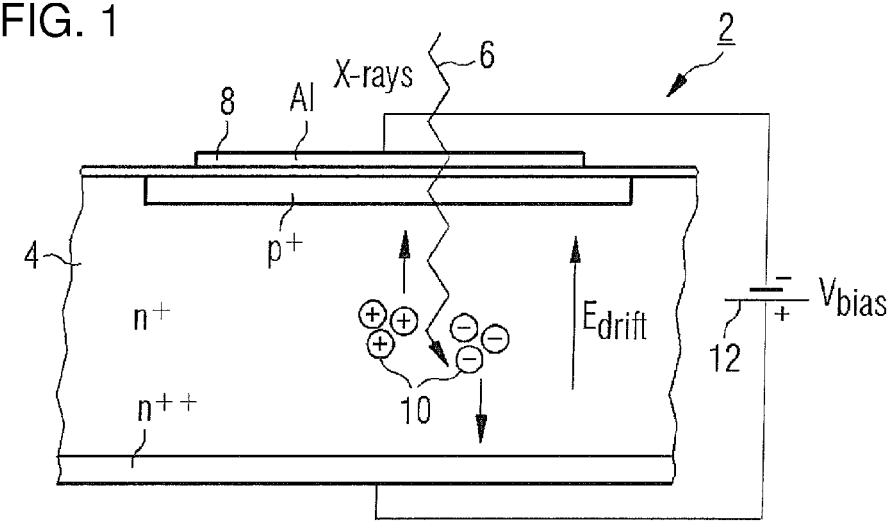
FIG. 1 a schematic view of the design of a photo-detector diode.

FIG. 1 illustrates schematically the architecture of a photo-detector diode 2 having a doped semiconductor $p^+$, $n^-$, $n^{++}$ trespassing section 4. The most commonly used material is a silicon crystal but also germanium, gallium arsenide or cadmium telluride are used.

An incident photon 6 having an energy in the range of 100 eV to several KeV before entering the doped semiconductor $p^+$, $n^-$, $n^{++}$ trespassing section 4 passes through a possible cover layer (e.g. aluminum) 8 and causes according to its energy and to the energy needed to create an electron hole pair a respective number of electron hole pairs 10 after x-ray absorption. In the drawings, this number of electron hole pairs is exemplarily shown by three electron-hole pairs 10 being divided by the electrical field generated by a source of bias potential 12.

Figure 2:
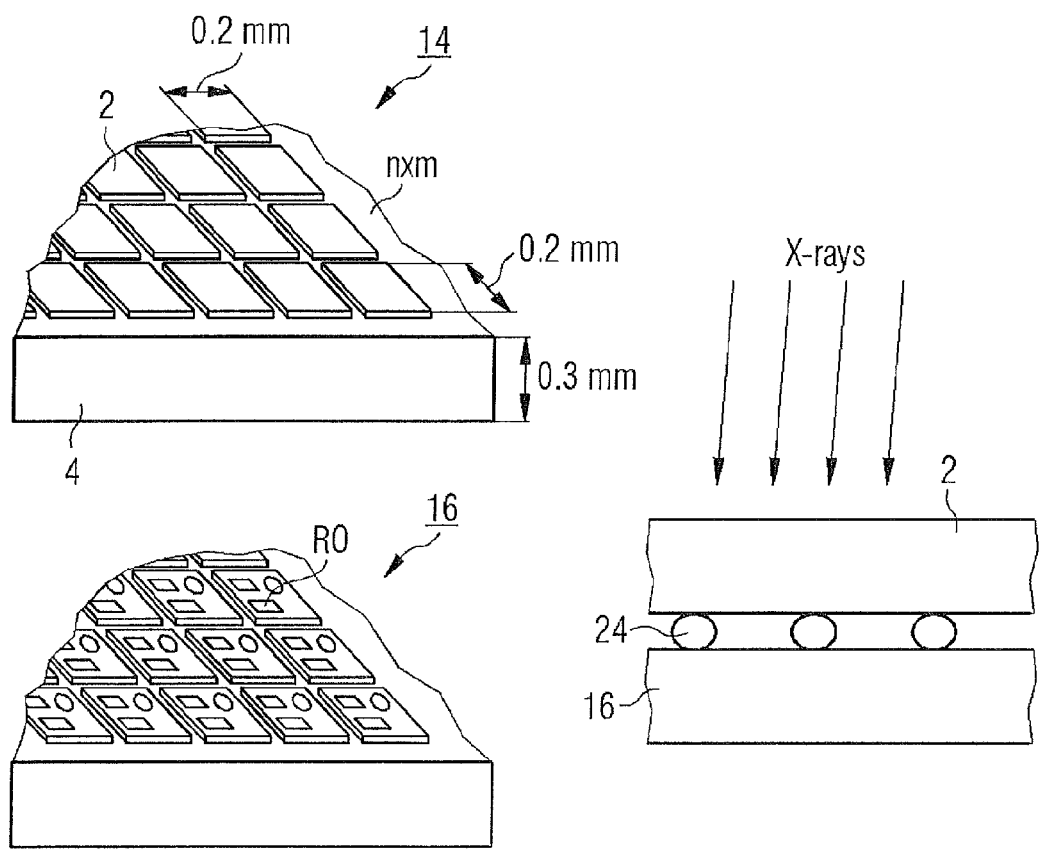
FIG. 2 a schematic view of a part of a detector module comprising an array of photo-detector diodes as one of them is shown in FIG. 1.

FIG. 2 shows a schematic view of a two-dimensional pixel detector 14 having a number of photo-detector diodes 2 arranged in an array of n rows and m columns. The photo detector diodes 2 have a length 1 and a width w of about 200 µm and a height of about 300 µm. Below the plane of these photo-detector diodes 2 a readout chip 16 having a corresponding number of readout unit cells RO is arranged for collecting the charge from the electron hole pairs 10 generated in the respective photo-detector diodes 2. The electrical conjunction between a diode output interface of the photo-detector diodes 2 and an input interface IN of the readout unit cell RO is achieved by bump bonding using for example indium bumps 24.

The new idea realized in the read out unit cell RO is to use a charge integrating system instead of a single photon counting system. The achievable low noise of the charge integrating system allows its use with single photon counting resolution.

Figure 3:
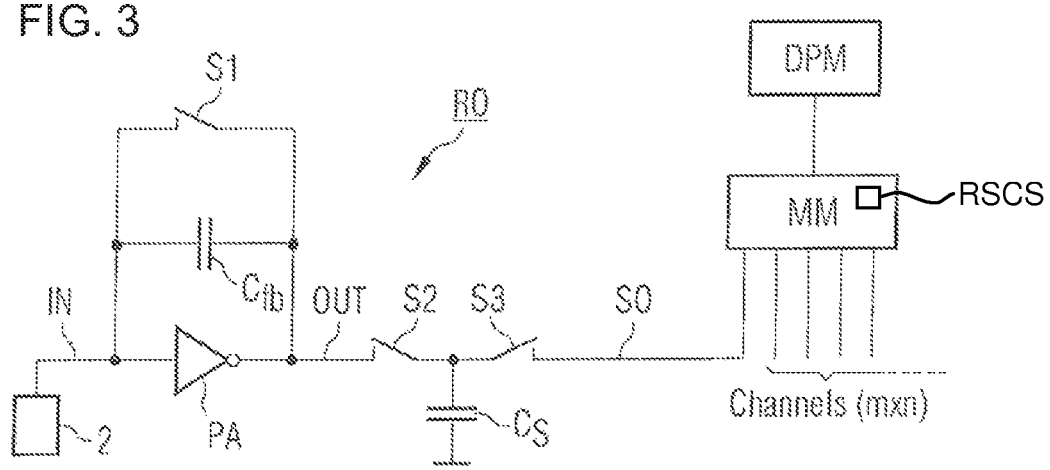
FIG. 3 a schematic view of a charge integrating preamp used within the read-out unit cell.
Figure 4:
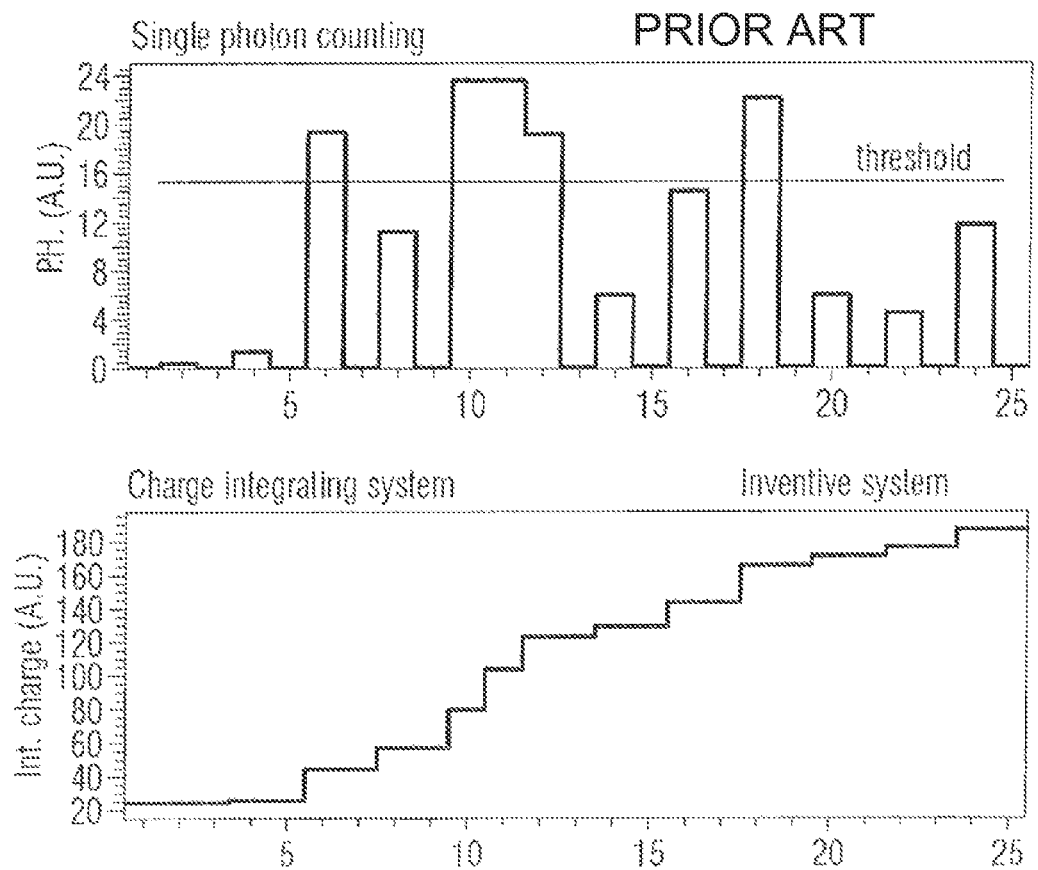
FIG. 4 the course of the analog signal after the preamp in a single photon counting system (prior art, upper graph) and in a charge integrating system (inventive system, lower graph).

In the read-out unit cell RO, in particular in its charge integrating system (see FIG. 3), the charge is amplified by a preamp PA and is integrated on an integration capacitor; no pulse is formed as in single photon counting systems according to the prior art. The voltage on the output OUT of the charge integration stage is proportional to the input charge (see FIG. 4, lower graph). At the end of the acquisition, the signal is stored on a hold capacitor Cs by switching a second switch S2 and the preamp PA is reset by switching a first switch S1. For the readout, the hold capacitor Cs of each channel is consecutively connected by switching a third switch S3 to a multiplexing means MM (signal out) and the output signal of the hold capacitor Cs is sampled with an external ADC in a data processing means DPM. The multiplexing means MM has a row select and column select circuit RSCS allowing an access to each readout cell unit RO.

Since the charge integration preamp PA integrates the entire charge generated by photons 6 in the detector diodes 2 connected at the input independent of the arrival time of the photons there is no pile up effect as in single photon counting systems. The signal at the output OUT corresponds to the total charge generated by the photons 6, i.e. to the total number of photons.

The preamp PA can be designed such that the electronic noise is small compared to the signal generated by a single photon 6. This allows a conversion of the analog output signal into the number of photons. The dynamic range of such a system can be in the order of 100-1000 photons. This means that 0, 1, 2, . . . 1000 photons can clearly be distinguished in the output signal OUT.

The count rate limitation (of e.g. 3 MHz per channel as in current single photon counting systems) can be overcome by a charge integrating system with single photon counting resolution, in which the output signal is converted into the number of photons (0 to 1000) and possibly, for each channel, added to an external counter. With an acquisition time of 1 µs such a system extends the count rate capability to 1000 MHz per channel, which would usually exceed the required count rates at today's synchrotron sources.

The system has a continuous mode, such that the data can be read out while the next acquisition is performed. For each channel an external counter (or several) can be implemented either in hardware or in software. In the counter the number of photons can be counted for several acquisitions (specifically in the continuous mode) allowing to increase the acquisition time from 1 µs to any desired value.

In addition to the above feature of extending the rate capability such a system has the following capabilities at photon rates which have a maximum of one photon per channel:

For photons 6 absorbed in a boundary region between adjacent photo-detector diodes 2 the charge is split between the two diodes 2 according to the position of the photon 6. This enables the possibility to make an interpolation of the position of the photons 6 which increases the spatial resolution much above the one given by the pixel size.

Since the measured signal height depends linearly on the energy of the photon a distribution of the measured signal heights corresponds to the measurement of an energy spectrum of the photons per channel.

A window discrimination can be implemented by only incrementing an external counter in the data processing means DPM for those photo-detector diodes (channels) where the measured signal lies within a certain window (energy window). This is specifically useful in combination with X-ray tubes, where the photons are not monochromatic and the background from high energy photons can significantly be reduced by only counting photons within an energy window.

Since it is desirable to have several counter per channel implemented (e.g. for pump and probe measurements), several counter per channel can be implemented externally (e.g. as an FPGA or in software within the data processing means DPM). This allows to measure the sample in e.g. two counter, each for a pumped state and an un-pumped state of the sample, resp, thereby overcoming the limitations for pump and probe measurements of todays single photon counting systems.

The invention claimed is:

1. An X-ray detector, comprising:
a layer of photosensitive material;
an N×M array of photo-detector diodes disposed in said layer of photosensitive material, each of said photo-detector diodes having a bias potential interface and a diode output interface, said bias potential interface of each of said photo-detector diodes being connected to a bias potential;
an N×M array of readout unit cells, one of said readout unit cells provided for each of said photo-detector diodes, each of said readout unit cells containing:
an input interface connected to said diode output interface;
a voltage amplifying device having an integration capacitor and an output, said voltage amplifying device having a noise signal being smaller as compared to a signal generated by a single photon incident;
a first switch disposed in parallel to said integration capacitor for short-circuiting said integration capacitor;
a second switch;
a third switch;
a signal output line;
a sample/hold capacitor disposed between said second switch and said third switch, said sample/hold capacitor is via said second switch connectable to said output of said voltage amplifying device and connectable via said third switch to said signal output line;
a data processing device; and
a multiplexing device containing a row select and a column select circuit allowing access to each of said read out unit cells, for reading out an analog signal stored in said sample/hold capacitor to said data processing device controlling said multiplexing device.

2. The X-ray detector according to claim 1, wherein said sample/hold capacitor and said integration capacitor are chosen to cover a dynamic range of 0 to 1000 photon incidents per acquisition interval.

3. The X-ray detector according to claim 2, wherein the acquisition interval ranges from 20 ns to any desired value.

4. The X-ray detector according to claim 1, wherein said first to third switches are operated to allow a continuous mode while reading out an output signal stored in said sample/hold capacitor and integrating an output voltage of said voltage amplifying device in parallel.

5. The X-ray detector according to claim 1, wherein said data processing device converts an output voltage per said readout unit cells to a number of photons and has at least one unit selected from the group consisting of registers, storage cells and counters implemented in software, firmware or hardware in which the number of photons can be stored.

6. The X-ray detector according to claim 5, wherein said data processing device contains a data multiplexer capable of adding the number of photons for each of said readout unit cells to said unit selected from the group consisting of registers, storage cells and counters.

7. The X-ray detector according to claim 6, wherein channel-wise one of said at least two counters is reserved to count incident photons for a pumped sample state and the other of said at least two counters is reserved to count the incident photons for an un-pumped sample state.

8. The X-ray detector according to claim 1, wherein said data processing device has for each interpolated position at least one register, storage cell or counter implemented either in software, firmware or hardware in which a number of photons can be stored.

9. The X-ray detector according to claim 1, wherein an integrated voltage for a single incident photon is indicative for energy of the single incident photon, wherein a dependency between the integrated voltage and the energy of the photon is determined by a polynomial function, and said data processing device being able to measure an energy spectrum of photons per channel.

10. The X-ray detector according to claim 9, wherein said data processing device has for each of said readout unit cells a number of units selected from the group consisting of registers, counters and storage cells, implemented either in hardware, software or firmware, and is capable of storing and/or building up per said readout unit cell the energy spectrum.

11. The X-ray detector according to claim 9, wherein the polynomial function is a linear function.

12. The X-ray detector according to claim 1, wherein said data processing device includes a window discrimination, implemented in either hardware software or firmware, thereby only incrementing a counter for channels having an output signal within a predetermined window.

13. An X-ray detector, comprising:
a layer of photosensitive material;
an N×M array of photo-detector diodes disposed in said layer of photosensitive material, each of said photo-detector diodes having a bias potential interface and a diode output interface, said bias potential interface of each of said photo-detector diodes being connected to a bias potential;

an N×M array of readout unit cells, one of said readout unit cells provided for each of said photo-detector diodes, each of said readout unit cells containing:

an input interface connected to said diode output interface;

a voltage amplifying device having an integration capacitor and an output;

a first switch disposed in parallel to said integration capacitor;

a second switch;

a third switch;

a signal output line;

a sample/hold capacitor disposed between said second switch and said third switch, said sample/hold capacitor connectable to said output of said voltage amplifying device via said second switch and connectable to said signal output line via said third switch;

a data processing device;

a multiplexing device containing a row select and a column select circuit allowing access to each of said read out unit cells, for reading out an analog signal stored in said sample/hold capacitor to said data processing device controlling said multiplexing device; and wherein said data processing device performs an interpolation of a position of an incident photon being absorbed in a boundary region between neighboring said photo-detector diodes due to a charge distribution in said neighboring photo-detector diodes, the interpolation being triggered by a coincident split voltage signal for said neighboring photo-detector diodes, wherein the coincident split voltage signal is smaller than a voltage signal of the incident photon absorbed within one of said photo-detector diodes.

* * * * *